June 9, 1925.  F. M. BROWN  1,540,756
FASTENER AND TIGHTENER FOR TIRE CHAINS
Filed Jan. 25, 1924

Inventor
Fred M. Brown.
by Orwig & Hague, Attys.

Patented June 9, 1925.

1,540,756

UNITED STATES PATENT OFFICE.

FREDERICK M. BROWN, OF FORT DODGE, IOWA.

FASTENER AND TIGHTENER FOR TIRE CHAINS.

Application filed January 25, 1924. Serial No. 688,519.

*To all whom it may concern:*

Be it known that I, FREDERICK M. BROWN, a citizen of the United States, and a resident of Fort Dodge, in the county of Webster and State of Iowa, have invented a certain new and useful Fastener and Tightener for Tire Chains, of which the following is a specification.

The object of my invention is to provide a fastener adapted to secure the ends of an anti-skid chain together, of simple, durable and inexpensive construction, so arranged that when fastened any jerking or pulling of the ends of the chain will have a tendency to lock the fastener in position.

A further object is to provide a fastener of the class above described in the nature of a pivoted bar so arranged that the bar may be used as a lever to assist in drawing the ends of the chain together.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
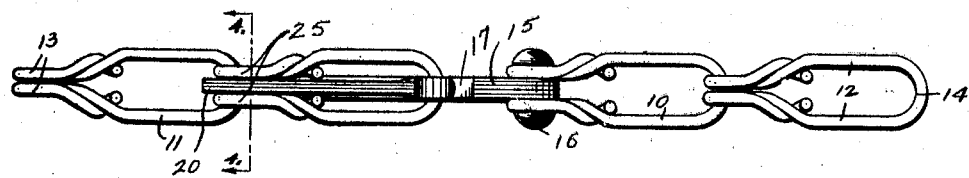
Figure 1 is a plan view of a short section of an anti-skid chain for automobile tires showing the manner in which my improved fastener is applied thereto.

The numeral 10 indicates a short section of an anti-skid chain of that type in most common use. The chain comprises a series of links 11. Each of the links is formed of a single piece of wire formed with a U-shaped portion 12, each of the ends being provided with a loop 13, said loops being parallel and adjacent to each other.

The member 12 is formed of comparatively stiff metal so that the loops 13 have a tendency to yieldably rest adjacent to each other. The U-shaped portion 12 of one link extends through the two loops, as clearly illustrated. The portion 12 is provided with a circular portion 14 which extends through the loops 13. It will be seen that any pulling strain on the two links will have a tendency to move the loops 13 toward each other, due to the concaved portion of the inner side of the member 14.

Figure 2:
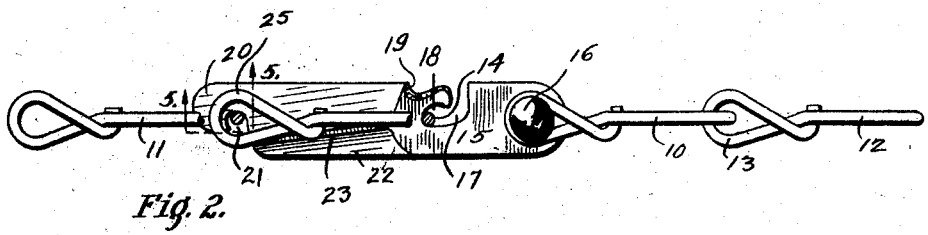
Figure 2 is a side elevation of the same.

My improved fastener comprises a bar 15 pivoted between the faces of the loops 13 about a rivet 16, said rivet extending through said loops. The outer edge of the bar 15 is provided with a transverse notch 17, the inner end of which terminates in a longitudinally extending portion 18. The edge of the bar 15 is also provided with a smaller notch 19 opposite the portion 18, as clearly shown in Figure 3. The free end of the bar 15 is provided with a longitudinally extending portion 20, the inner edge of which is provided with a notch 21 forming a hook on the end of the bar. The inner edge of the bar 15 is tapered at 22, best shown in Figure 4, said tapered edge terminating in shoulders or ribs 23 which extend longitudinally with the side faces of said bar, between the notch portion 18 and the free end of the bar. Said ribs extend at a slight angle relative to their inner and outer edges. The distance between the notch portion 18 and the free end of the bar 15 is substantially equal to the pitch of the chain links so that one of the members 14 may rest in the notch portion 18, while the other member 14 of the next link will rest in the notch 21, as clearly shown in Figure 2.

Figure 3:
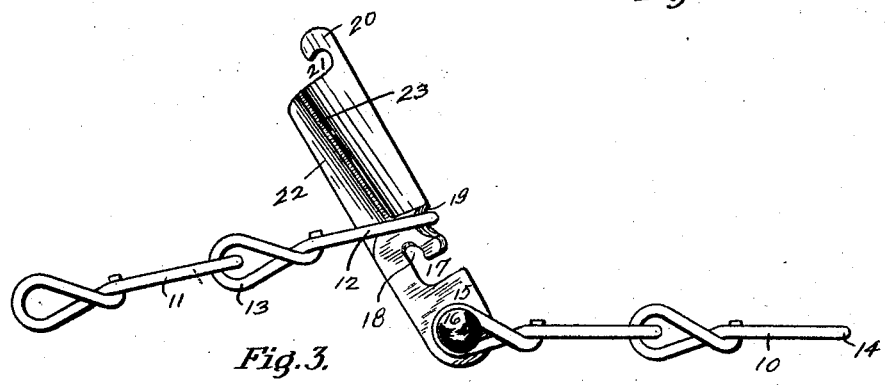
Figure 3 is a side elevation showing the manner in which the fastener is used as a chain tightener.
Figure 4:
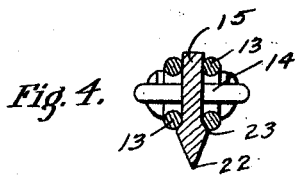
Figure 4 is a detail sectional view taken on the line 4—4 of Figure 1.
Figure 5:
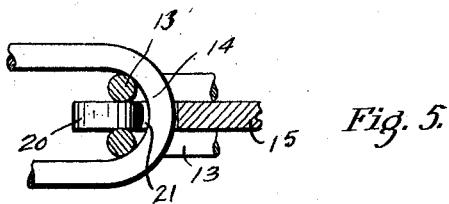
Figure 5 is an enlarged detail sectional view taken on the line 5—5 of Figure 2.

The device is operated by simply extending the bar 15 through any desired link in the opposite end of the chain from which the bar is pivoted in the manner shown in Figure 3. If the chain is comparatively tight, the link portion 14 will rest in the notch 19, after which the free end of the link 15 may be swung in a clockwise direction, as shown in Figure 3, pulling the ends of the chain together until the portion 14 drops into the notch 17, after which the bar 15 is permitted to move in an opposite direction and will be swung to position shown in Figure 2, with the hook 20 between the faces of the loops 13. The wedge portion 22 has a tendency to spring the loop portions apart. The shoulders 23 rest inside of the loops as clearly shown in Figure 4. The tendency of the loops 13 to move inwardly toward each other will then prevent the bar 15 from being swung outwardly.

It will be seen that any pulling tendency applied to the two ends of the chain tending to move them in the opposite direction will only lock the device that much tighter, due to the fact that the loop 14 has a tendency to pull the loops 13 toward each other. Even if the links of the free end of the chain are moved at right angles to their natural position, they cannot be unfastened, and the only way in which the bar may be unlocked is to grasp the bar in the hand with the edge 22 resting against the inner face of the operator's fingers and then apply the thumb to the upper portion of the loop at the point 25, and at the same time grasping the opposite ends of the chain, from which the bar is pivoted, in the other hand, and then moving the two hands toward each other so as to release the pulling strain between the links. The loops 13 will then be free to move outwardly and the bar may be easily unlocked.

Thus it will be seen that I have provided a chain fastener and tightener of simple, durable and inexpensive construction which may be easily and quickly locked, and when locked will not come unlocked by any pulling or jerking of the connected ends of the chain. It is almost impossible to unlock the same while there is any tension on the two ends of the chain, regardless of what direction the tension is applied in. I have also provided a device which may be used as a chain tightener, obviating the necessity of carrying a separate tool for that purpose.

I claim as my invention:

1. A chain fastener comprising a bar having a transversely arranged pivot pin upon one end, one edge being provided with a notch and its free end provided with a hook, one edge provided with diverging sides terminating in longitudinally extending shoulders, and a restricted portion above said shoulders, substantially as described and for the purposes stated.

2. A chain fastener comprising a bar having a pivot member at one end and its outer edge provided with a notch, a second notch between the first said notch and the free end of said bar, the outer end of said bar being provided with a hook and its inner edge formed wedge shaped, terminating in longitudinally extending shoulders.

3. A chain fastener comprising a number of chain links, each having adjacent and yieldable members, a bar pivotally connected to one of said links and adapted to fasten the ends of the chain together by swinging from an open to a closed position, said bar being locked in its closed position by the tension of the adjacent and yieldable members of one of said links.

4. A chain fastener comprising a number of U-shaped links, each of which has its ends formed into loops, the said loops being held yieldably toward each other, the body portion of one of said links being extended through the loops of an adjacent link, and a bar pivotally connected between the yieldable loops of a third link, said bar being provided with a notch for receiving the second one of said links, said bar being designed to move to position between the yieldable ends of the second said link, and to be yieldably secured in position by the pressure therefrom, said links and said bar being so arranged that any pulling on the links tending to separate the first and second links, will squeeze the yieldable members of the second link together.

5. A chain fastener comprising a U-shaped link having each of its ends provided with a loop, the loops being parallel and yieldably supported adjacent to each other, a second link similar to the first said link, mounted in the loops thereof, a bar pivoted between the faces of the loops of the second link, the outer edge of said bar being provided with a notch, the free end of said bar being provided with a shoulder and having its inner edge formed wedge-shaped, terminating in longitudinal shoulders, and a third link designed to enter the notch of said bar, while the wedge-shaped portion of the inner edges of the bar are designed to enter between the loop portions of the said link and to spread them apart, with the said longitudinal shoulders inside of said loops and with the shoulder of said bar extending over said first link.

6. A chain fastener comprising a number of chain links, each having adjacent and yieldable members, a bar pivotally connected to one of said links and adapted to fasten the ends of the chain together by swinging from an open to a closed position, said bar being locked in its closed position by the tension of the adjacent and yieldable members of one of said links, the parts being so arranged that any tension applied to separate the ends of the chain will cause the yieldable members to be more firmly pressed together.

Des Moines, Iowa, January 8, 1924.

FREDERICK M. BROWN.